Nov. 23, 1965 R. L. GREUNKE ET AL 3,219,842

VOLTAGE LEVEL MONITORING DEVICE

Filed Sept. 13, 1962 2 Sheets-Sheet 1

INVENTOR.
RICHARD L. GREUNKE
LLOYD THAYNE
BY
Philip H. Sheridan
ATTORNEY

VOLTAGE LEVEL MONITORING DEVICE

Filed Sept. 13, 1962 2 Sheets-Sheet 2

INVENTOR.
RICHARD L. GREUNKE
LLOYD THAYNE
BY Philip H. Sheridan
ATTORNEY

United States Patent Office 3,219,842

Patented Nov. 23, 1965

3,219,842
VOLTAGE LEVEL MONITORING DEVICE

Richard L. Greunke and Lloyd Thayne, Arapahoe County, Colo., assignors to Martin Marietta Corporation, Baltimore, Md., a corporation of Maryland Filed Sept. 13, 1962, Ser. No. 223,389
6 Claims. (Cl. 307—88.5)

This invention relates to a voltage level monitoring device, and more particularly to such a device employing a circuit, including parallel channels which have their outputs combined, adapted to indicate an input voltage (1) less than a first predetermined value (2) a voltage between the first predetermined value and a second predetermined value, and (3) a voltage greater than the second predetermined value.

Prior art voltage level monitoring devices possess many disadvantages. Some of them consume objectionable amounts of power or the threshold voltage of the device is unduly high. Others make inadequate provision for varying the modulation frequency at which the device can be operated. The input impedance of some prior art devices is not sufficiently high to minimize loading error in some cases and objectionable drift is encountered with time and temperature variations.

Accordingly, it is an important object of the invention to provide a voltage level monitoring device which will operate with relatively low power consumption.

Another object of this invention is to provide such a device wherein the difference in input voltage between the inactive and fully active states, or threshold voltage is considerably reduced as compared to prior art devices.

A further object of this invention is to provide such a device wherein provision is made for operation thereof over an appreciable range of modultaion frequencies.

A still further object of this invention is to provide such a device which can be adapted to have a high input impedance to minimize the loading error and which will not exhibit objectionable amounts of drift with time and temperature variations.

Additional objects of this invention will become apparent from the following description, which is given primarily for purposes of illustration, and not limitation.

Stated in general terms, the objects of this invention are attained by providing a voltage level monitoring device which comprises a pair of parallel channels which are fed from a cathode follower and have their outputs combined in a mixer circuit. Each channel includes a modulator and current limiter arrangement embodying a transistor which employs a square wave modulation introduced as the base to emitter control voltage, a negative resistance means, such as a tunnel diode, connected in the collector circuit of the transistor and an "on-off" switch, such as a transistor switch. The two channels are essentially the same except that the modulation of one channel is 180° out of phase with the other channel and the activating voltage of the one channel is higher than that for the other channel. The injut voltages to be monitored are fed into the cathode follower and the output signals from the switch are fed into a recorder.

Figure 1:
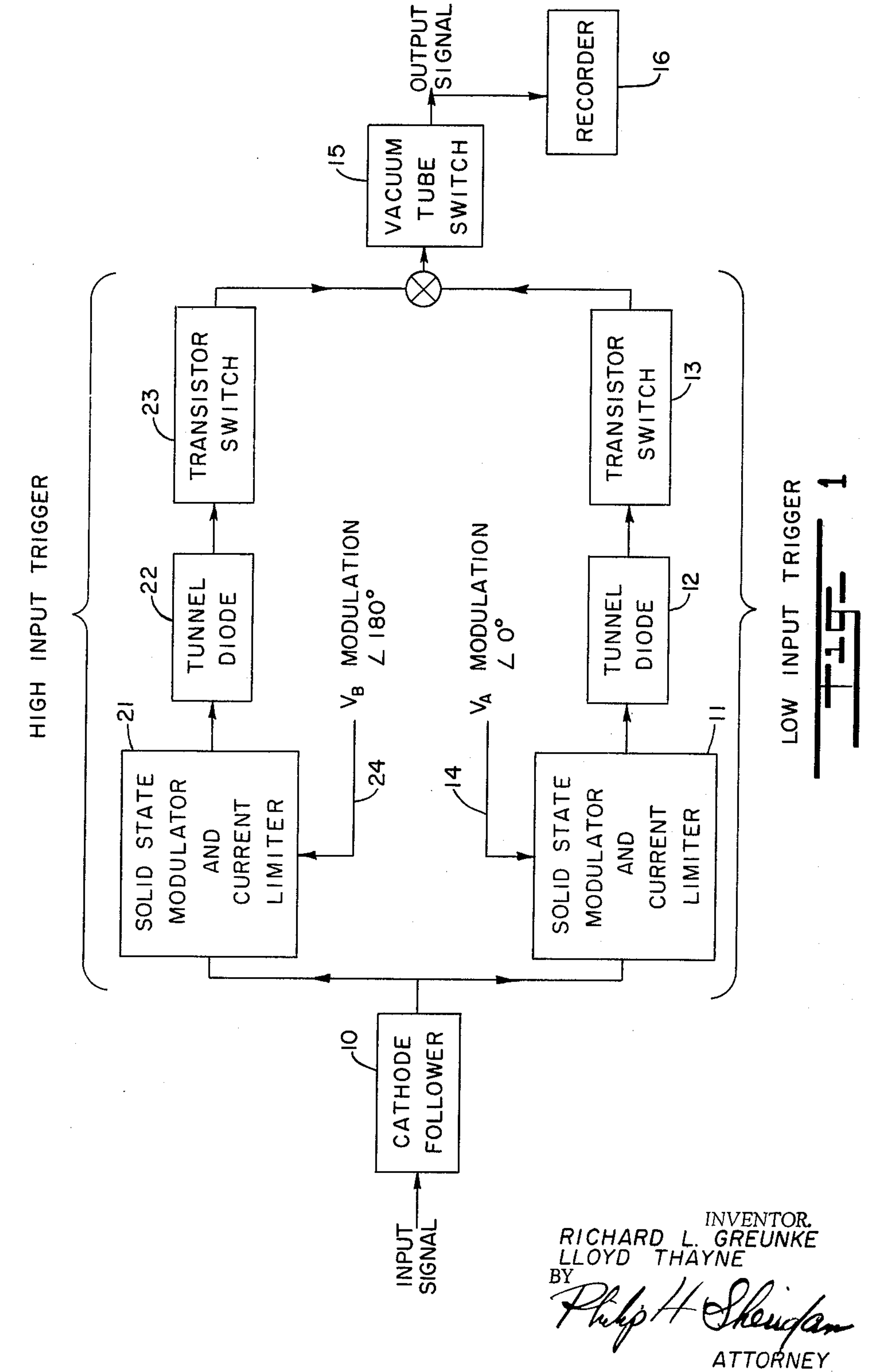
Figure 2:
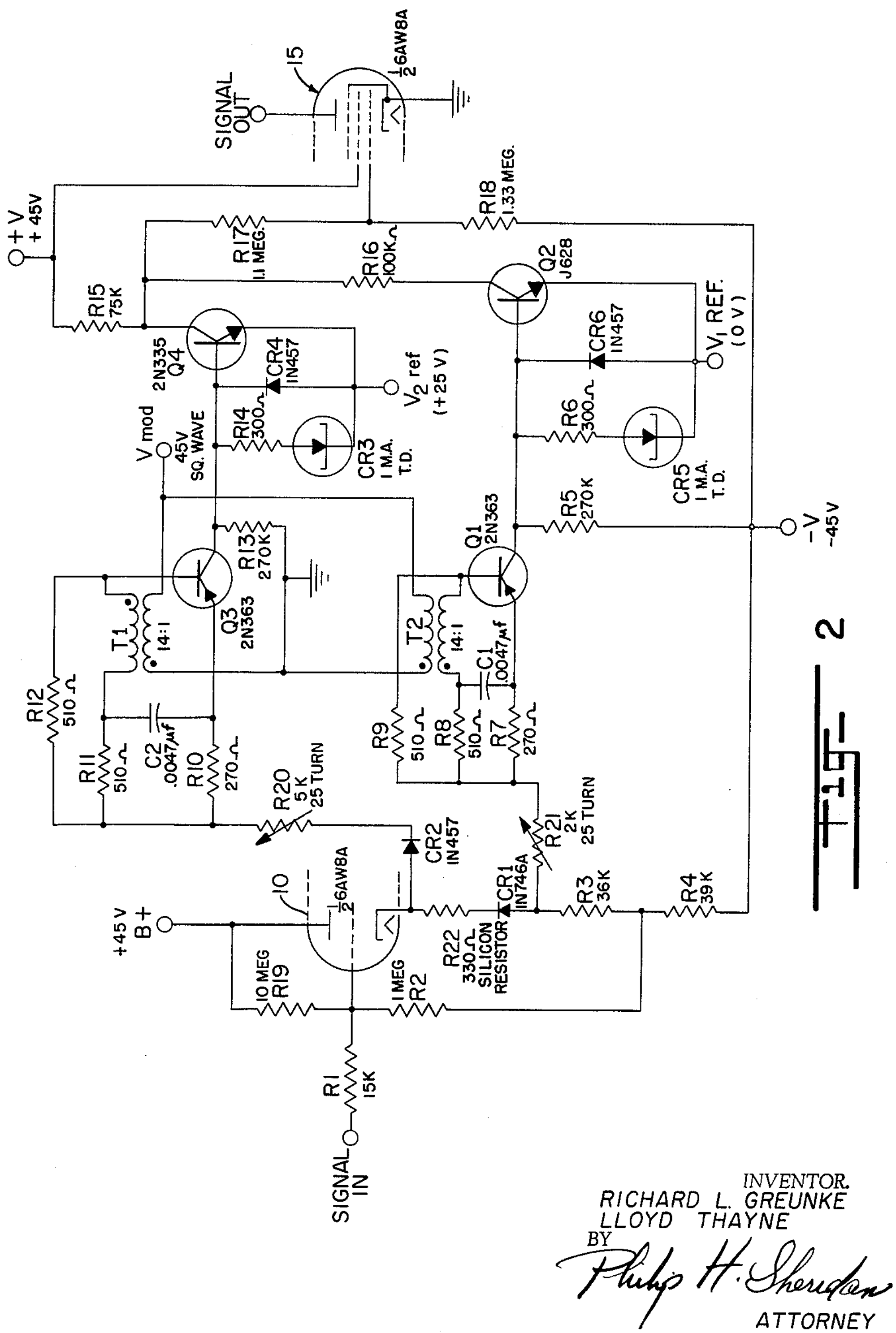

A more detailed description of a preferred embodiment of the invention is given below with reference to the accompaying drawings, wherein:

FIG. 1 is a block diagram schematically showing the voltage level monitoring device of this invention; and FIG. 2 is a detailed schematic circuit diagram showing a specific embodiment of the signal conditioner amplifier of this invention.

The signal conditioner amplifier, or voltage level monitoring device of this invention, as shown in FIG. 1, receives an input signal which passes through a cathode follower 10, preferably having a minimum input impedance of about 1 megohm. After passing through cathode follower 10, the signal is applied to two similar, parallel channels. One channel triggers at input voltages in excess of a predetermined reference and is labeled "low input trigger" in FIG. 1. The other chanel triggers at input voltages in excess of a higher predetermined reference level, and is labeled "high input trigger" in FIG. 1. Because of their operational similarity, only the low input trigger channel will be described in detail.

The signal current from cathode follower 10 passes through the "solid state modulator and current limiter" 11 to the tunnel diode 12 and to the transistor switch 13. Solid state modulator and current limiter 11 consists of a transistor Q1 (FIG. 2) which is driven by a constant voltage amplitude square wave, V mod. (FIG. 2). The constant voltage amplitude square wave V mod. is externally generated and introduced as indicated at 14 (FIG. 1) into solid state modulator and current limiter 11, or transistor Q1. Transistor Q1 either restricts or passes the flow of signal current to tunnel diode 12, or CR5 (FIG. 2). At low signal levels, up to a few volts above the activating point, the modultaor and current limiter 11, or transistor Q1, passes signal current proportional to the applied signal voltage during an "on" cycle. As the signal voltage level increases beyond this voltage, modulator and limiter 11 limits the current to a safe value. This action protects tunnel diode 12 and transistor Q1 from excessive dissipation.

The operation of tunnel diode 12, and the circuitry following the tunnel diode, can best be explained by first considering modulator 11 to be in an "off" situation, and then in an "on" condition. When modulator 11 is "off," the current flowing to tunnel diode 12 is relatively low, the diode acts as a short to the base-to-emtiter diode of transistor switch 13, or Q2 (FIG. 2), is turned "off" and a low level output appears at the vacuum tube switch or output pentode 15 and recorder 16.

When modulator 11 is "on" the signal current flowing into tunnel diode 12 is proportional to the input signal voltage level. If the signal current exceeds the peak current of tunnel diode 12, the tunnel diode switches, that is, changes to a higher voltage state. The total voltage drop across tunnel diode 12 (CR5, FIG. 2), and its associated circuitry, then exceeds input threshold voltage of the transistor switch 13 of FIG. 1 or Q2 of FIG. 2 base-to-emitter diode. Current is forced into the base of transistor switch 13, and the switch is driven into saturation. As transistor switch 13 turns on, the collector voltage swing of the transistor switch turns off vacuum tube switch 15 (output pentode) and activates recorder 16, causing the recorder pen to write.

Thus at signal voltages in excess of the activating point of tunnel diode 12, the low input trigger channel just described, causes the pen of recorder 16 to write a dashed or broken line with a repetition rate equal to the modulation frequency. The high input trigger channel, consisting of modulator 21, tunnel diode 22 and transistor switch 23, operates in the same manner as that of the low input trigger channel, except that it requires a higher signal voltage level to activate tunnel diode 22 than to activate tunnel diode 12. The corresponding symbols used in FIG. 2 for modulator 21, tunnel diode 22 and transistor switch 23 are Q3, CR3 and Q4, respectively. Modulator 21, or transistor Q3, is driven by a constant voltage amplitude square wave VB, which is externally generated and introduced, as indicated at 24, and is 180° out of phase with that of the wave VA introduced into modulator 11 at 14. Thus the signal output for the high input trigger channel is 180° out of phase with that of the low input trigger channel, and when both outputs activate recorder 16, the recorder pen writes a solid, unbroken line, which represents the sum of the outputs of both channels.

In the embodiment described above, the signal conditioner amplifier of this invention produces coded readouts on an electric pen recorder 16 as a function of the input signal voltage level. The coded readouts are presented in three distinct forms: (1) non-writing, (2) dashed line and (3) solid line, corresponding to input signal voltage levels of (1) less than a first predetermined voltage V1, (2) greater than V1 and less than a higher voltage V2 and (3) greater than voltage V2, respectively.

A specific working model of the signal conditioner amplifier of the invention is shown in FIG. 2. Its operating characteristics are tabulated below:

| | |
|---|---|
| Ambient temperature range | 25° to 65° C. |
| Input impedance | 1 megohm minimum. |
| Output load | One channel of an electric stylis recorder per amplifier. |
| Modulation frequency | 30 to 60 c.p.s. (30 c.p.s. recommended). |
| Input signal range | 0.0 to 32.0 volts D.C. |
| Output when signal input is less than 1.250 v. | Recorder does not write. |
| Output when signal input is between 1.500 and 24.500 v. | Recorder writes dashed line at repetition rate of modulation frequency. |
| Output when signal level exceeds 25.500 v. | Recorder writes solid line. |
| Response time | Equal to one period of the modulation frequency. |

Circuit element 10 (½ of 6AW8A) is a triode vacuum tube which provides the required high input impedance and is connected as a cathode follower. Resistor R1 (15K) in series with the input limits the grid current when and if the input voltage exceeds the B+ voltage (+45 v.). Resistor R2 (1.0 meg.) is connected to the junction of resistors R3 (36K) and R4 (39K) (rather than —V) to provide "bootstrapping" of R2, thereby causing it to draw less current from the input signal (this increases the input impedance to a value greater than R2). Resistor R19 (10 meg.) also helps to increase the apparent input impedance by providing some bias current. Diode CR1 (IN746A) is a zener breakdown device and provides a nearly constant voltage drop for a wide range of cathode follower output current. R22 (330ω) is a silicon resistor which has a predictable resistance variation with ambient temperature changes and is employed to oppose (i.e., cancel) the temperature coefficient of diode CR1.

The low trigger channel in the working model was designed to operate (cause the pen to write a dashed line) whenever the signal input exceeded 1.5 volts. Also, in the working model V1 ref. was at ground potential (zero volts). Since the cathode potential is higher than the signal input, (the triode 10 requires a negative grid bias) the low trigger channel input at R21 (2K25 turns) is taken from the junction of CR1 and R3 so that the negative grid bias voltage of triode 10 is cancelled by the positive voltage drop across CR1 and R22. Thus, the input to the low trigger channel is at approximately the same D.C. potential as that which is present at the signal input terminal.

Both the high and low trigger channels are identical up to the final transistors Q2 (J628) and Q4, (2n335) except that the high input trigger channel has a decoupling diode CR2 (IN457). CR2 prevents undue loading (and hence, an output error) of triode 10 by electrically disconnecting the high input trigger channel whenever the voltage at triode 10 cathode is lower than the voltage applied to V2 ref. (+25 v.). Due to the similarity of the high and low trigger channels, the low trigger channel circuitry only will be described realizing that the comparable components in the high trigger channel have the same functional tasks to perform. Variable resistor R21 is used as a fine adjustment to set the value of signal input voltage which is required to actuate the low trigger channel. Transformer T2 (14:1) provides D.C. ground isolation, thereby allowing the V mod. (45 v. square wave) voltage to be referenced to any desirable D.C. potential and to allow the same V mod. voltage to be applied to both the high and low trigger channels without incurring "common grounding" problems. At the same time the transformers provide a simple means of supplying two modulation signals to the two channels and allowing 180° phase shift on one with respect to the other while driving both from the same source. Resistors R8 (510ω) and R9 (510ω) form a voltage divider reducing the output voltage of transformer T2 and thereby limiting the drive to Q1 (2N363) to a lower value in keeping with desired Q1 operation.

R7 (270ω) in the emitter of Q1 causes the collector current of Q1, during the Q1 "on" cycle of operation, to be limited to a value where the voltage drop across R7 is equal to the voltage across R9 minus the VBE drop of Q1. Thus, both the output of voltage divider R8, R9, and the resistance of R7 control the "constant current" feature of modulator 21. Capacitor C1 (.0047 μf.) improves the wave form of the modulator by speeding up the switching action of Q1 when the square wave drive voltage V mod. changes level.

During the Q1 "on" cycle of modulation nearly all the current flowing through R21 (that is, all except for a few mocroamperes of current which passes through R5 (270K) also passes through tunnel diode CR5 (1 ma. T.D.). When this current exceeds the peak current to tunnel diode CR5, it switches to its high voltage state. The high voltage state of tunnel diode CR5 is not sufficiently high of itself to guarantee conduction of the base emitter junction of Q2. Therefore, resistor R6 is provided to produce an additional voltage drop guaranteeing that whenever CR5 switches to its high voltage state, the potential at the base of Q2 causes conduction of the base emitter junction and Q2 switches "on."

Resistor R5 is returned to a potential —V (—45 v.) which is more negative than potential V1 ref. and, during the "off" cycle of modulator Q1, resistor R5 provides a negative bias to CR5, forcing CR5 to return to its low voltage state and causing Q2 to switch "off." Diode CR6 (IN457) protects the base emitter junction of Q2 from excessive back bias during the Q1 "off" cycle. The collector loads, R15 (75K) and R16 (100K), are connected together so that the voltage at their common point is approximately at +V (+45 v.) whenever both Q2 and Q4 are switched "off" and the common point voltage is approximately at V2 ref. (+25 v.) when either Q2 or Q4 are switched on.

Thus, the outputs of Q2 and Q4 are summed at the common point of resistors R15 and R16. R17 (1.1 meg.) and R18 (1.33 meg.) form a voltage divider (and D.C. level change) such that when the voltage at the common point of R15 and R16 is at +V, the control grid voltage of pentode 15 (½ 6AW8A) is near the cathode voltage of pentode 15, and pentode 15 is switched to saturation. When the voltage at the common point of R15 and R16 is at V2 ref. (+25 v.), the divider action of R17 and R18 causes the control grid of pentode 15 to be sufficiently lower than the cathode voltage so that pentode 15 is cut off and no output current can flow.

This working model lowered the per unit power consumption, increased the input impedance by a factor of about 200, decreased the threshold voltage (input difference between full "on" and full "off") to less than 5 mv. compared to 5 to 20 mv. for a prior art circuit, provided for variation of modulation frequency and greatly reduced problems of drift with time and temperature changes. The voltage level monitoring device of this invention, has a broad range of applications, which can be obtained by making value changes or by making replacements of the parts or components shown in FIG. 2. The basic operation, however, remains the same. For example:

(1) By appropriately choosing the transistor switches Q2 and Q4, the usable voltage range can be greatly varied.

(2) Increased voltage range also can be attained by making appropriate changes in the compensated Zener diode, CR1.

(3) In situations where high input impedance is not required, input cathode follower 10 can be omitted from the device.

(4) The output pentode or vacuum tube switch 15 can be replaced by an equivalent solid state component if a more expansive unit is permissible; or it can be eliminated from the device if a lower voltage output is feasible.

(5) The firing point of the high input trigger channel is adjustable by changing the predetermined reference voltage level $V_2$. This is limited only by the output swing required and the power supplies to transistor switches Q2 and Q4.

(6) The activating point of the low input trigger channel can be similarly adjusted by changing the predetermined reference voltage level $V_1$.

(7) The resistors, R6 and R14, in series with tunnel diodes CR5 and CR3, respectively, can be omitted if germanium transistors are used for the switches Q2 and Q4, respectively, or if tunnel diodes with a larger voltage swing over the negative conductance region are used.

(8) Tunnel diodes CR3 and CR5 can be replaced by an equivalent negative resistance region device, if desired.

(9) The current limit can be changed to different values desired by changing the values of resistors R7 and/or R10.

In summary, in the embodiment of the invention described above, the high input and low input trigger channels are essentially the same except that the modulation of one channel is 180° out of phase with the other and the firing voltage of the high input trigger channel is higher than that of the low input trigger channel. The arrangement is such that an input having a magnitude below the low input trigger channel operating level results in a no-signal output from the vacuum tube switch or output pentode 15 while an input of an intermediate level and above that previously mentioned results in an activation of the low level tunnel diode CR5 during its respective modulation portion to thereby effect a square wave output from the output pentode 15 and a dashed line at pen recorder 16. Both the high and low level tunnel diodes, CR3 and CR5, repsectively, are activated during their respective modulation portions upon the application on an input having a magnitude above the operating level of the high input trigger channel, the resultant output of pentode 15 and pen recorder 16 being a summation of both channels which is in effect, solid or continuous, and is recorded as a solid line.

The input voltage to be monitored is applied to a high input impedance cathode follower 10 to minimize loading error. The output of the cathode follower is passed through an externally driven solid state switch (Q1 or Q3) and applied to a tunnel diode (CR5 or CR3) detector circuit. The tunnel diode detector has two stable states and at the high point of regeneration the incremental gain approaches infinity. The high transition gain affords low threshold, with a circuit repeatability of about 5 millivolts, or less, as referenced to the input voltage under given environmental conditions. The tunnel diode output is used to drive a second solid state switch (Q2 or Q4) which, in turn, drives a vacuum tube switch 15 capable of a large output voltage swing. The externally driven solid state switch (Q1 or Q3) previously mentioned is employed to periodically interrupt the signal to the tunnel diode detector (CR5 or CR3) for the purpose of returning the tunnel diode to its stable low voltage state.

Although the voltage level monitoring device of this invention was described hereinabove as comprising two parallel channels, it will be understood that the invention contemplates the use of only one channel including, as best shown in FIG. 1, a solid state modulator and current limiter 11, a tunnel diode 12 and a transistor switch 13. This single channel has been described hereinabove with reference to FIG. 2, and it is used in a manner similar to that described above, except that it is used as a voltage condition code, that is, to give a discrete (a constant-level including zero) indication or a dashed (interrupted) indication.

Obviously, many other modifications and variations of the present invention are possible in the light of the above teachings. It is, therefore, to be understood that, within the scope of the appended claims, the invention can be practiced otherwise than as specifically described. In the claims, the language "on-off switch" is intended to indicate levels only and not saturation or complete non-conduction.

What is claimed is:

1. A voltage level monitoring device comprising:

a pair of parallel channels, one channel having a higher activating level then that of the other channel, each channel including in series arrangement:

a transistor adapted to receive a square wave modulation control signal;

a negative resistance means connected to said transistor;

an on-off switch connected to said negative resistance means;

means to provide a square wave modulation control signal to each channel with that provided to one channel being 180° out of phase with that provided to the other channel; and means for feeding voltages to be monitored as input signals to each channel.

2. A voltage level monitoring device as set forth in claim 1, wherein said negative resistor means is connected to the collector circuit of said transistor;

and further including:

means for combining the output signals of each channel.

3. A voltage level monitoring device, as set forth in claim 2, wherein said negative resistance means is a tunnel diode and said on-off switch is connected thereto.

4. A voltage level monitoring device, as set forth in claim 2, wherein said on-off switch is a transistor switch.

5. A voltage level monitoring device, as set forth in claim 2, wherein said voltage feeding means is a cathode follower.

6. A voltage level monitoring device comprising:

a pair of parallel channels, one channel having a higher activating level then that of the other channel, each channel including in series arrangement:

a modulation means adapted to receive a repetitive signal;

a negative resistance means connected to the modulation means;

an on-off switch connected to the negative resistance means;

means to provide a square wave modulation control signal to each channel with that provided to one channel being 180° out of phase with that provided to the other channel;

means for feeding voltages to be monitored as input signals to the channel; and means for combining the output signals of each channel.

References Cited by the Examiner

UNITED STATES PATENTS

| | | | |
|---|---|---|---|
| 2,779,869 | 1/1957 | Gerks | 324—77 X |
| 2,784,910 | 3/1957 | Ghiorso et al. | 328—151 X |
| 3,021,517 | 2/1962 | Kaenel. | |
| 3,153,748 | 10/1964 | Metzadour | 307—88.5 |

JOHN W. HUCKERT, *Primary Examiner.*

RUDOLPH V. ROLINEC, *Examiner.*